March 18, 1924.

M. G. CAMPAU

LENS DIAPHRAGM

Filed April 29, 1921

1,487,536

M. G. Campau
INVENTOR

BY Victor J. Evans
ATTORNEY

WITNESS

Patented Mar. 18, 1924.

1,487,536

UNITED STATES PATENT OFFICE.

MERLE G. CAMPAU, OF OCONTO, NEBRASKA.

LENS DIAPHRAGM.

Application filed April 29, 1921. Serial No. 465,413.

*To all whom it may concern:*

Be it known that I, MERLE G. CAMPAU, a citizen of the United States, residing at Oconto, in the county of Custer and State of Nebraska, have invented new and useful Improvements in Lens Diaphragms, of which the following is a specification.

The object of my present invention is the provision of improved moving picture projection means comprising a lens contracting device which renders it feasible to employ a four blade shutter with a view to eliminating flicker and which is adapted to cut out the high lights or glare in a projected picture to such a degree that every minute object photographed on the film is projected in a clear manner.

To the attainment of the foregoing, the invention consists in the improvement as hereinafter described and definitely claimed.

In the accompanying drawings, forming part hereof:—

Similar numerals designate corresponding parts in all of the views of the drawings.

Figure 1:
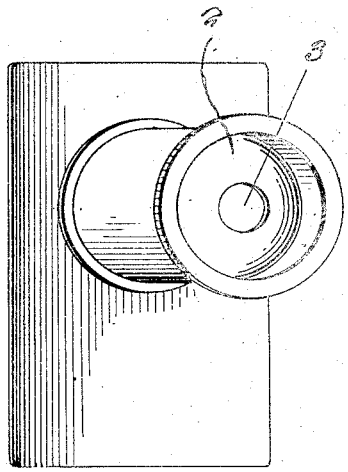
Figure 1 is a view of so much of a moving picture projection apparatus as is necessary to impart an understanding of my invention.
Figure 2:
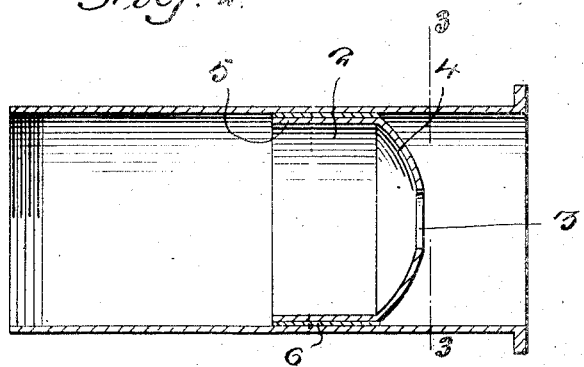
Figure 2 is a longitudinal diametrical section illustrating in the lens tube the contracting means constituting the preferred embodiment of my invention.
Figure 3:
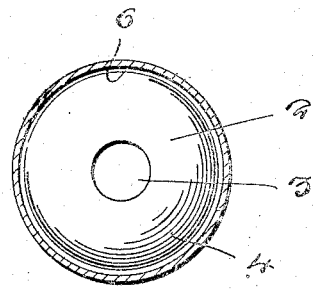
Figure 3 is a transverse section taken in the plane indicated by the line 3—3 of Figure 2 looking rearwardly.

The lens tube is peculiar in that it is equipped with a contracting device 2 characterized by a small central opening 3; the said opening 3 being in the center of the front wall of the device 2 which front wall is concavo-convex or generally conical with its convex side foremost. In addition to the said forward wall which is numbered 4 the contracting device comprises a cylindrical body 5 which is covered with felt or other appropriate material indicated by 6, the two-fold function of which is to frictionally hold the contracting device in the lens tube and to preclude the passage of light between the body 5 and the lens tube. The rear side of the wall 4 of the contracting device will of course be made black in any appropriate manner well known in the art.

In the practical use of my improvement the small opening 3 in the wall 4 of the contracting device will serve to cut out high lights and glare in a projected picture and assure the clean cut projection of every object photographed on the film.

Having described my invention, what I claim and desire to secure by Letters Patent, is:—

As a new article of manufacture, a contracting device for lens tubes comprising a cylindrical body, a concavo-convex front wall fixed to the said body and arranged with its convex side foremost and having a central opening, and a covering of friction creating and light excluding material carried by the body and adapted to retain the contracting device in a position in which it is placed in a lens tube.

In testimony whereof I affix my signature.

MERLE G. CAMPAU.